US009344446B2

(12) United States Patent
Thomas et al.

(10) Patent No.: US 9,344,446 B2
(45) Date of Patent: *May 17, 2016

(54) SYSTEMS AND METHODS FOR MALWARE DETECTION AND SCANNING

(71) Applicant: Verisign, Inc., Reston, VA (US)

(72) Inventors: Ralph Thomas, Atlanta, GA (US);
Michael Lapilla, Washington, DC (US);
Trevor Tonn, McLean, VA (US);
Gregory Sinclair, Concord, NC (US);
Blake Hartstein, Leesburg, VA (US);
Matthew Cote, Reston, VA (US)

(73) Assignee: VERISIGN, INC., Reston, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/480,289

(22) Filed: Sep. 8, 2014

(65) Prior Publication Data

US 2014/0380482 A1  Dec. 25, 2014

Related U.S. Application Data

(63) Continuation of application No. 12/982,508, filed on Dec. 30, 2010, now Pat. No. 8,832,836.

(51) Int. Cl.
*H04L 29/06* (2006.01)
*G06F 21/56* (2013.01)
*G06F 9/455* (2006.01)

(52) U.S. Cl.
CPC .......... *H04L 63/145* (2013.01); *G06F 9/45533* (2013.01); *G06F 21/566* (2013.01); *H04L 63/1466* (2013.01); *H04L 63/1483* (2013.01)

(58) Field of Classification Search
CPC .............. G06F 21/566; G06F 9/45533; H04L 63/1466; H04L 63/1483; H04L 63/145
See application file for complete search history.

(56) References Cited

U.S. PATENT DOCUMENTS 6,182,227 B1    1/2001  Blair et al.
7,519,982 B1    4/2009  Gordon et al.
(Continued)

OTHER PUBLICATIONS

Jin-Cherng Lin et al., "Anti-malicious Injection Based on Metaprograms", Journal of Computers, vol. 19, No. 1, Apr. 2008, pp. 13-22.

(Continued)

*Primary Examiner* — Kaveh Abrishamkar
*Assistant Examiner* — Tri Tran
(74) *Attorney, Agent, or Firm* — MH2 Technology Law Group, LLP

(57) ABSTRACT

Systems and methods are provided for malware scanning and detection in a computing system. In one exemplary embodiment, the method includes launching, in a computing device of the computing system, a virtual machine, and launching, in the virtual machine of the computing device, an internet browser. The method also includes requesting, by the internet browser, data from a web page, and performing, using one or more analysis tools, analysis on the web page. In the method, performing analysis on the web page includes performing monitoring and recording of system application programming interface (API) calls, and creating software objects associated with the web page. The method also includes performing antivirus scanning of the software objects, de-obfuscating JavaScript associated with the software objects, and correlating data associated with the performed analysis to determine if the web page is a malicious web page.

24 Claims, 5 Drawing Sheets

(56) References Cited

U.S. PATENT DOCUMENTS

| | | | |
|---|---|---|---|
| 7,599,920 | B1 | 10/2009 | Fox et al. |
| 7,836,502 | B1 | 11/2010 | Zhao et al. |
| 2002/0129277 | A1 | 9/2002 | Caccavale |
| 2004/0044962 | A1 | 3/2004 | Green et al. |
| 2005/0283833 | A1 | 12/2005 | Lalonde et al. |
| 2006/0136374 | A1 | 6/2006 | Shelest et al. |
| 2006/0174345 | A1 | 8/2006 | Flanagan et al. |
| 2006/0253458 | A1 | 11/2006 | Dixon et al. |
| 2007/0074169 | A1* | 3/2007 | Chess et al. .................. 717/126 |
| 2007/0174915 | A1* | 7/2007 | Gribble et al. .................. 726/24 |
| 2007/0208822 | A1 | 9/2007 | Wang et al. |
| 2007/0277237 | A1* | 11/2007 | Adelman et al. ................ 726/22 |
| 2008/0133540 | A1 | 6/2008 | Hubbard et al. |
| 2008/0183889 | A1 | 7/2008 | Andreev et al. |
| 2008/0301051 | A1* | 12/2008 | Stahlberg ........................ 705/44 |
| 2008/0301281 | A1 | 12/2008 | Wang et al. |
| 2008/0320595 | A1 | 12/2008 | Van der Made |
| 2009/0070873 | A1 | 3/2009 | McAfee et al. |
| 2010/0031353 | A1 | 2/2010 | Thomas et al. |
| 2010/0186088 | A1 | 7/2010 | Banerjee et al. |
| 2011/0072514 | A1 | 3/2011 | Gilder et al. |
| 2011/0197272 | A1* | 8/2011 | Mony .............................. 726/12 |
| 2011/0219454 | A1* | 9/2011 | Lee et al. ........................ 726/25 |
| 2012/0174224 | A1 | 7/2012 | Thomas et al. |
| 2012/0174225 | A1 | 7/2012 | Shyamsunder et al. |

OTHER PUBLICATIONS

Peter Rathgeber et al., "An Intention-based Malware Attack Prevention System", White Paper, Ikona Software, Inc., Aug. 2009, pp. 1-9.

Yi-Min Wang et al., "Automated Web Patrol with Strider HoneyMonkeys: Finding Web Sites that Exploit Browser Vulnerabilities", Microsoft Research, Retrieved from http://citeseerx.ist.psu.edu/viewdoc/summary/?doi=10.1.1.100.224, 2006, pp. 1-15.

Author Unknown, "The Websense ThreatSeeker Network: Leveraging Websense HoneyGrid Computing", White Paper, Websense, Inc., 2008, pp. 1-14.

Author Unknown, "Sucuri—Protect Your Interwebs", http://sucuri.net/about, 2010, pp. 1-2.

Author Unknown, "Web Anti-Malware Solution, Malware Monitoring, Malware Scanning: Dasient Solution", White Paper, Dasient, Inc., 2010, pp. 1-2.

International Search Report and Written Opinion dated Apr. 5, 2012, International Application No. PCT/US2011/067357 filed Dec. 27, 2011, pp. 1-12.

Ali Ikinici, "Monkey-Spider: Detecting Malicious Web Sites", http://monkeyspider.sourceforge.net/Diploma-Thesis-Ali-Ikinici.pdf, May 23, 2007, pp. 1-88.

Radek Hes et al., "The Capture-HPC Client Architecture", http://ecs.victoria.ac.nz/twiki/pub/Main/TechnicalReportSeries/ECSTR09-11.pdf, Oct. 31, 2010, pp. 1-8.

Author Unknown, "Client Honeypot", Wikipedia, http://en.wikipedia.org/w/index/.php?title=Client_honeypot&oldid=371196519, Retrieved from the Internet on Jul. 1, 2010, 1 page.

Author Unknow, "Snort (software)", Wikipedia, http://en.wikipedia.org/w/index.php?title=Snort_%28software%29&oldid=401501779, Retrieved on Dec. 9, 2010, pp. 1-2.

International Search Report and Written Opinion dated Apr. 5, 2012, International Application No. PCT/US2011/067358 filed Dec. 27, 2011, pp. 1-13.

Christian Seifert, "Know Your Enemy: Malicious Web Servers", http://www.net-security.org/dl/articles/KYE-Malicious_Web_Servers.pdf, Aug. 9, 2007, pp. 1-25.

Xiaoyan Sun et al., "Collecting Internet Malware Based on Client-side Honeypot", Young Computer Scientists, ICYCS, The 9th International Conference for IEEE, Nov. 18, 2008, pp. 1-6.

Non-Final Office Action dated Nov. 6, 2014, U.S. Appl. No. 12/982,540, filed Dec. 30, 2010, pp. 1-24.

Final Office Action dated Apr. 21, 2015, U.S. Appl. No. 12/982,540, filed Dec. 30, 2010, pp. 1-29.

* cited by examiner

SYSTEMS AND METHODS FOR MALWARE DETECTION AND SCANNING

RELATED APPLICATIONS

This application is a continuation of U.S. patent application Ser. No. 12/982,508, filed Dec. 30, 2010 (allowed) and is related to U.S. patent application Ser. No. 12/982,540, filed Dec. 30, 2010, entitled "SYSTEMS AND METHODS FOR MALWARE DETECTION AND SCANNING," (pending) the entire contents of which is incorporated herein by reference in its entirety.

TECHNICAL FIELD

The present disclosure generally relates to systems and methods for improved malware detection and scanning, and, more particularly, to systems and methods for improved malware detection and scanning using virtual machines.

BACKGROUND

The growth of computer networking has brought with it an explosion in the number of malicious software attacks, commonly referred to as malware attacks. These malware attacks may include viruses, worms, trojan horses, spyware, rootkits, denial of service attacks (DDOS), and other malicious programs. Malware is often installed on computers running browsers while communicating with malicious web sites that exploit browser vulnerabilities. That is, flaws either in the browser or automatically launched external programs and extensions can allow a malicious web page to install malware automatically when a user visits the malicious web page, such that the user may not be aware of the installation.

Often multiple malware exploits or tasks are implemented in tandem, causing a computer to download, store, and then execute a malware executable, also referred to as a binary module. In many cases, a successful exploit results in the automatic installation of a malware binary module, often called a "drive-by download." The installed malware may enable a malware attacker to gain remote control over the compromised computer system and, in some cases, enable the malware attacker to steal sensitive information, send out spam, or install more malicious executable modules over time.

Malware propagation wastes valuable resources, such as system user time, system administrator resources, network bandwidth, disk space, and CPU cycles. Malware can also corrupt data files such that the originals may not be recoverable. Additionally, malware can cause the compromised computer to transmit confidential data (e.g., banking information, passwords, etc.) to the malware attacker.

The disclosed embodiments address one or more of the problems set forth above.

SUMMARY

In one exemplary embodiment, the present disclosure is directed to a method for malware scanning and detection in a computing system, the method comprising: launching, in a computing device of the computing system, a virtual machine; launching, in the virtual machine of the computing device, an internet browser; requesting, by the internet browser, data from a web page; and performing analysis on the web page using one or more analysis tools, wherein performing analysis includes: performing monitoring and recording of system application programming interface (API) calls, creating software objects associated with the web page, performing antivirus scanning of the software objects, de-obfuscating JavaScript associated with the software objects, and correlating data associated with the performed analysis to determine if the web page is a malicious web page.

In another exemplary embodiment, the present disclosure is directed to a computing system for malware scanning and detection, the system comprising: at least one memory to store data and instructions; and at least one processor configured to access the at least one memory and, when executing the instructions, to: launch, in a computing apparatus of the computing system, a virtual machine; launch, in the virtual machine, an internet browser; request, by the internet browser, data from a web page; and perform analysis on the determined web page using one or more analysis tools, wherein when the at least one processor is configured to perform the analysis, the at least one processor is further configured to perform monitoring and recording of system application programming interface (API) calls, create software objects associated with the web page, perform antivirus scanning of the software objects, de-obfuscate JavaScript associated with the software objects, and correlate data associated with the performed analysis to determine if the web page is a malicious web page.

In another exemplary embodiment, the present disclosure is directed to a method for malware scanning and detection in a computing system, the method comprising: performing, using at least one computing device of the computing system, monitoring and recording of system application programming interface (API) calls; creating, using the at least one computing device, software objects associated with the web page; performing, using the at least one computing device, antivirus scanning of the software objects; de-obfuscating, using the at least one computing device, JavaScript associated with the software objects; and correlating, using the at least one computing device, data associated with the performed analysis to determine if the web page is a malicious web page.

In another exemplary embodiment, the present disclosure is directed to a computing system for malware scanning and detection, the system comprising: at least one memory to store data and instructions; and at least one processor configured to access the at least one memory and, when executing the instructions, to: perform monitoring and recording of system application programming interface (API) calls, create software objects associated with the web page, perform antivirus scanning of the software objects, de-obfuscate JavaScript associated with the software objects, and correlate data associated with the performed analysis to determine if the web page is a malicious web page.

BRIEF DESCRIPTION OF THE DRAWINGS

The accompanying drawings, which are incorporated in and constitute a part of this disclosure, illustrate aspects consistent with the present disclosure and, together with the description, serve to explain advantages and principles of the present disclosure. In the drawings.

DETAILED DESCRIPTION

Figure 1A:
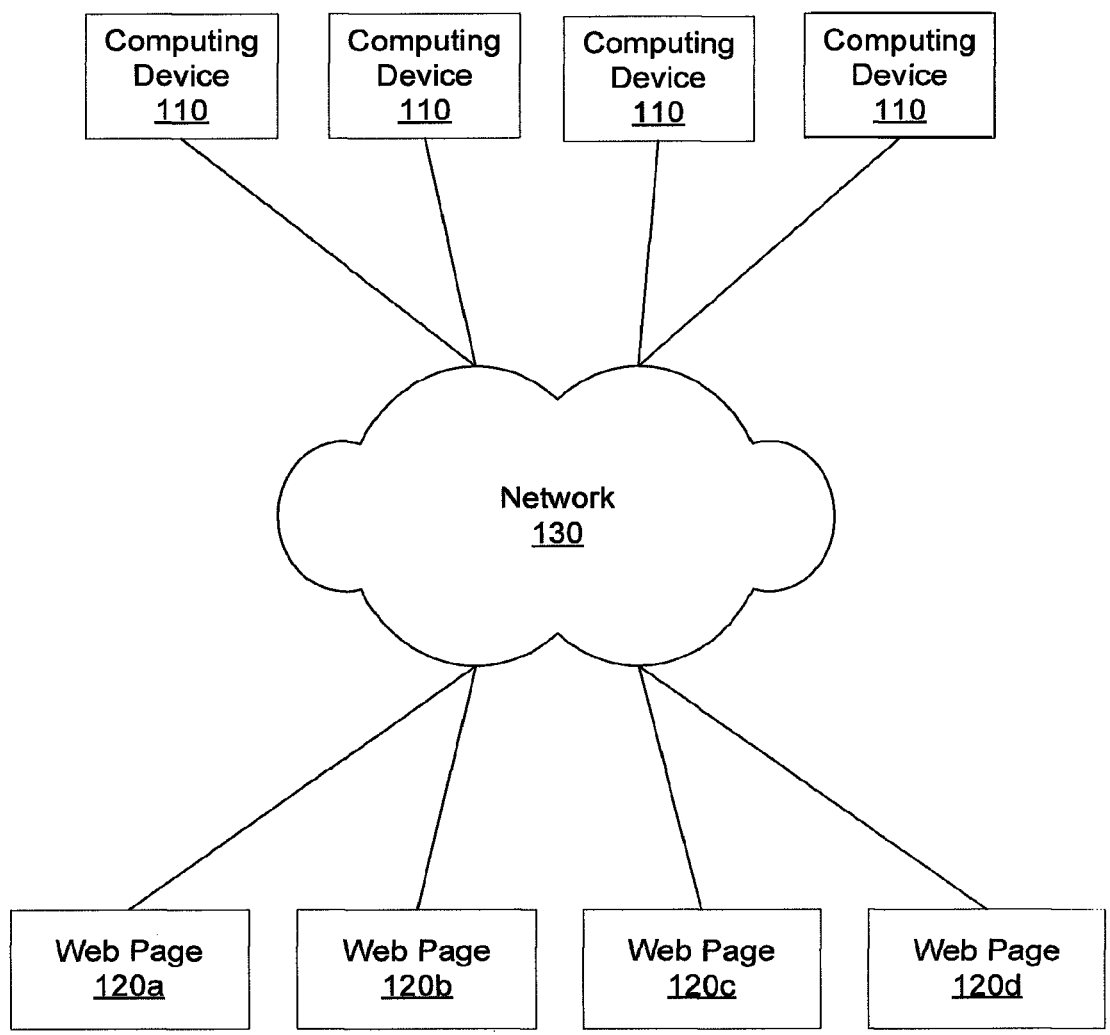
FIG. 1a illustrates a first example computing system for performing malware scanning and detection, consistent with certain disclosed embodiments.

The prevalence of malware has led to the development of malware detection software. The developed malware detection software may be installed on a user's computer to detect malware when a user performs a search on a supported search engine. In such a case, the malware detection software may consult one or more lists of web sites known to promulgate malware (e.g., a blacklist) to advise the user as to whether the web pages referenced in the search results may contain malware. These lists may be created through the use of malware tools that "crawl" the Internet (or World Wide Web), identifying malware-infected web pages. Using a combination of malware detection algorithms and tools, both static and dynamic analytical tools, malware detection can be performed.

Honeypots are one tool that may be used to preemptively detect and prevent malware infections. Generally, a honeypot is a computing device configured to detect and/or analyze attempts at unauthorized use of computing systems. In some embodiments, a honeypot is designed to be exploited in as many ways possible and to "fool" malicious webservers into thinking the honeypot is a real user visiting a web page. By seeking to be exploited as often as possible, honepots allow malicious web pages to be identified and campaigns that span plural web pages across plural domains to be tracked. Typically, a honeypot is configured to operate with an internet browser and/or operating system known to be vulnerable to malware attacks or have software flaws. Using a combination of diversified IP addresses and honeypots, malware detection can be performed more effectively.

It is to be understood that both the foregoing general description and the following detailed description are exemplary and explanatory only and are not restrictive of the disclosure, as claimed.

The following detailed description refers to the accompanying drawings. Wherever possible, the same reference numbers will be used throughout the drawings and the following description to refer to the same or like parts. While several exemplary embodiments and features are described herein, modifications, adaptations and other implementations are possible, without departing from the spirit and scope of the disclosure. For example, substitutions, additions or modifications may be made to the components illustrated in the drawings, and the exemplary methods described herein may be modified by substituting, reordering or adding steps to the disclosed methods. Accordingly, the following detailed description does not limit the disclosure.

FIG. 1a is a block diagram of an example computing system 100a in which systems and methods consistent with the present disclosure may be implemented. Specifically, FIG. 1a illustrates an example computing system 100a that allows malware scanning and processing in a distributed computing environment. In FIG. 1a, computing system 100a includes one or more computing devices 110 (e.g., computing device 110a, computing device 110b, computing device 110c, and computing device 110d), one or more web pages 120 (e.g., web page 120a, web page 120b, web page 120c, and web page 120d), and network 130.

Computing devices 110 may each be a computing device configured to receive malware scan requests, perform malware scanning, processing, and analysis, and report data related to the malware scan requests. For example, each of computing devices 110 may be configured to perform honeypotting, analysis, and "crawl" functions. Computing devices 110 may be a server, client, mainframe, desktop, laptop, network computer, workstation, personal digital assistant (PDA), tablet PC, telephony device, and the like. In one embodiment, computing device 110 may be a computer configured to receive and process malware scan requests using a virtual machine. Computing devices 110 may be configured to communicate with one or more web pages 120 via network 130.

Web pages 120 may each be generally understood to be a document or information resource that is suitable for access via the Internet (or World Wide Web). For example, web pages 120 may be retrieved from a computer, such as computing devices 110. Typically, web pages 120 are accessed through an internet browser and displayed on a monitor, such as a monitor associated with a laptop or desktop computer, or a display, such as the display of a mobile device. Often, the information in web pages 120 is in Hypertext Markup Language (HTML), Extended HTML (XTML), or Extensible Markup Language (XML) format, and include navigation links to other web pages 120, i.e., hypertext links. Web pages 120 may also include other resources, such as, for example, style sheets, scripts, images, objects, and the like. Web pages 120 are typically transferred using Hypertext Transfer Protocol (HTTP).

Network 130 may be any appropriate network that allows communication between or among one or more computing systems, such as, for example, computing system 100a, and/or computing devices, such as, for example, computing devices 110. Network 130 may include, for example, the Internet, a local area network, a wide area network, a WiFi network, a workstation peer-to-peer network, a direct link network, a wireless network, or any other suitable communication network. Connection with network 130 may be wired, wireless, or any combination thereof. In one exemplary embodiment, network 130 may allow communication between computing devices 110 and one or more web pages 120.

Figure 1B:
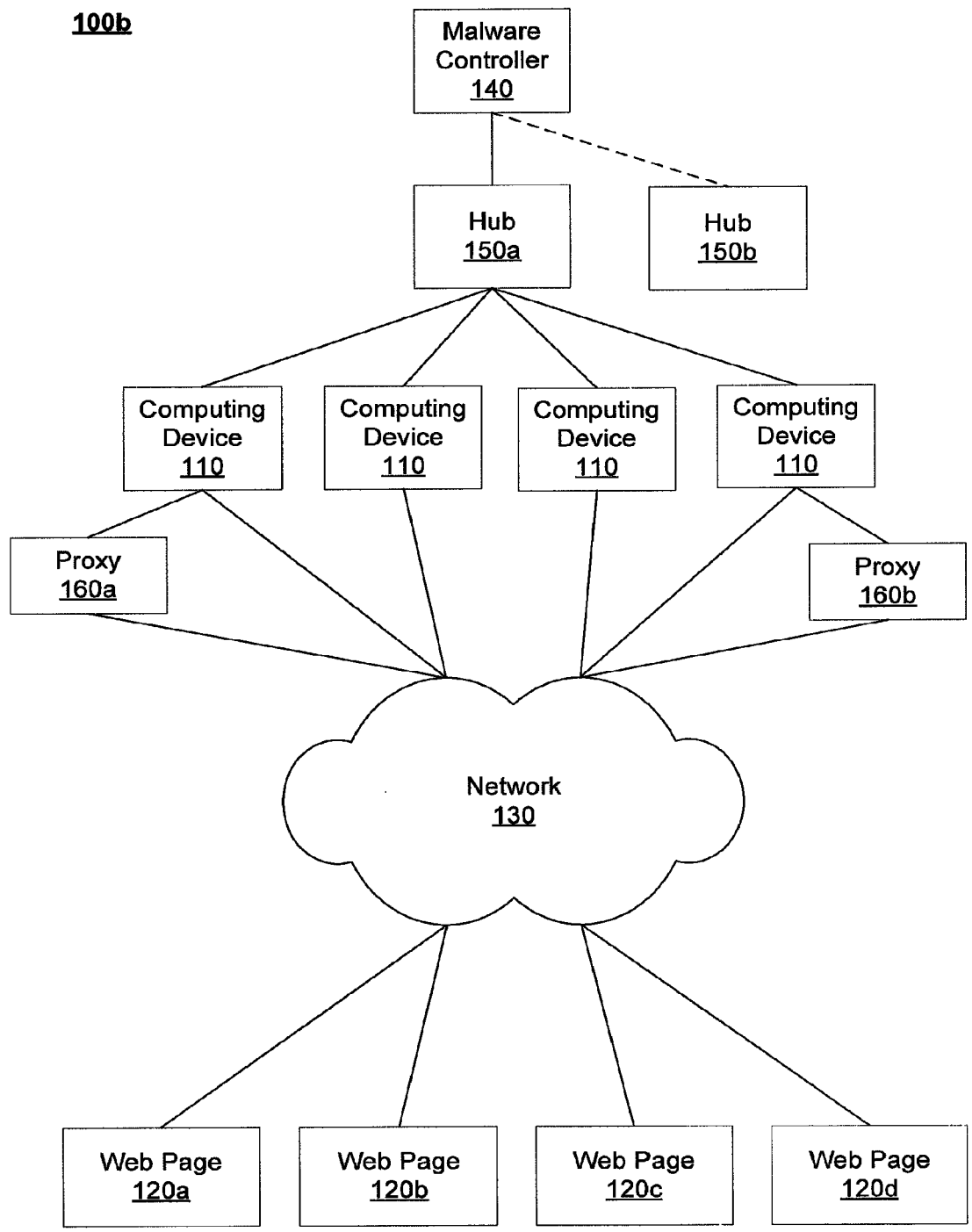
FIG. 1b illustrates a second example computing system for performing malware scanning and detection, consistent with certain disclosed embodiments.

FIG. 1b is a block diagram of an example scalable hub-and-spoke computing system 100b in which systems and methods consistent with the present disclosure may be implemented. Specifically, FIG. 1b illustrates an example scalable hub-and-spoke computing system 100b that allows distributed processing across multiple computing devices. In FIG. 1b, scalable hub-and-spoke computing system 100b includes one or more computing devices 110 (e.g., computing device 110a, computing device 110b, computing device 110c, and computing device 110d), one or more web pages 120 (e.g., web page 120a, web page 120b, web page 120c, and web page 120d), network 130, a malware controller 140, one or more hubs 150 (e.g., hub 150a and hub 150b), and one or more proxies (e.g., proxy 160a and proxy 160b).

As used in FIG. 1b, computing device 110 may also be referred to as a "thick spoke," and may be configured to be an autonomous computing device operable to perform honeypot, analysis, and "crawl" functions. Also, as used in FIG. 1b, proxy 160 may be referred to as a "thin spoke," and may be a computing device functioning as the proxy of a thick spoke to aid in IP diversification. Generally, IP diversification may be achieved the use of a diverse range of IP addresses to perform web crawling.

As shown in FIG. 1b, malware controller 140 may be any type of computing device, many of which are known in the art. Malware controller 140 may be configured to receive malware scan requests, and send the malware scan requests to one or more hubs 150 for further processing. Malware controller 140 may also be configured to analyze data to autonomously identify malware scan requests, and send the malware scan requests to one or more hubs 150 for further processing. Malware scan requests may include one or more parameters, such as, for example, target uniform resource identifiers (URIs), uniform resource locators (URLs), and/or uniform resource names (URNs); types and/or number of browsers to use when visiting the targeted URIs, URLs, and/or URNs; a priority of the malware scan request; how many links (e.g., hypertext links) to extract from the targeted URIs, URLs, and/or URNs and visit; number of pages of the targeted URN, URLs, and/or URNs to visit, specific hostnames for which links can be extracted from the targeted URIs, URLs, and/or URNs and visited; rate-limiting parameters; etc. The one or more target URIs, URLs, and/or URNs may, for example, be used to identify web pages 120 upon which malware scanning is to be performed by computing system 110.

As illustrated by FIG. 1b, malware controller 140 may be in communication with hub 150a. In addition, malware controller 140 may also be in communication with another hub, i.e., hub 150b, as illustrated by the dashed line from malware controller 140 to hub 150b. That is, malware controller 140 may be configured to send instructions, including malware scan requests, and data to hub 150a, and to receive data, including results of malware scan requests, from hub 150a. However, in the event hub 150a should become inoperable or there is a loss of communication between malware controller 140 and hub 150a, malware controller 140 may also communicate with hub 150b, and be configured to immediately begin sending instructions and data to hub 150b, and begin receiving data from hub 150b. In such an embodiment, hub 150b may be considered to be a backup hub 150 that is on "hot standby." Although malware controller 140 is illustrated in FIG. 1b as connected only to hubs 150a and 150b, malware controller 140 may be connected to and/or in communication with any number of hubs 150.

Hub 150 may be a computing device configured to perform data management, load management, and work delegation to one or more computing devices 110. As illustrated in FIG. 1b, hub 150a may be in communication with one or more computing devices 110, including computing devices 110a, computing devices 110b, computing devices 110c, computing devices 110d, and computing devices 110e. Thus, hub 150a, the active hub 150 in the example of FIG. 1b, may be configured to perform load management for computing devices 110a, 110b, 110c, 110d, and 110e, and delegate malware scan requests received from malware controller 140 to one or more computing devices 110a, 110b, 110c, 110d, and 110e based on load management determinations. Although hub 150a is illustrated in FIG. 1b as connected only to computing devices 110a, 110b, 110c, 110d, and 110e, hub 150a may be connected to and/or in communication with any number of computing devices 110 such that the number of computing devices 110 may be scalable in both an increasing and decreasing manner.

Proxies 160 may be any computing device configured to serve as an internet proxy. In the embodiment illustrated by FIG. 1b, computing devices 110 may be configured to use one or more proxies 160 to make traffic appear to originate from a different source based on an IP address associated with proxy 160. In some embodiments, computing devices 110 and proxies 160 may be within the same netblock ("/24") of IP addresses (i.e., the last eight bits). In other embodiments, computing devices 110 and proxies 160 may be in different netblock of IP addresses. In still other embodiments, computing devices 110 and proxies 160 may be geographically separated.

Further details of the hub-and-spoke computing system 110b of FIG. 1b can be found in co-pending U.S. patent application Ser. No. 12/982,540, filed Dec. 30, 2010, entitled "SYSTEMS AND METHODS FOR MALWARE DETECTION AND SCANNING," (pending) the entire contents of which is incorporated herein by reference in its entirety.

Figure 2:
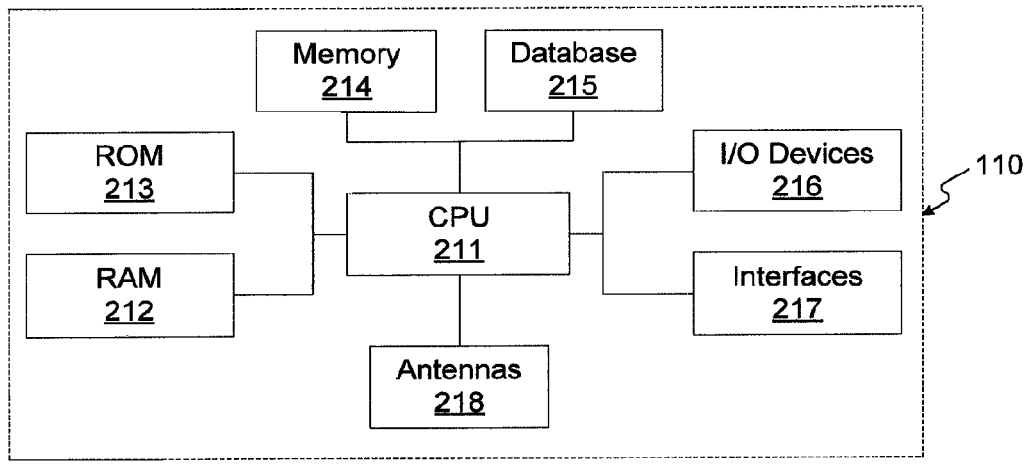
FIG. 2 illustrates an example computing device for performing malware scanning and detection, consistent with certain disclosed embodiments.

FIG. 2 is a block diagram of an exemplary computing device 110, consistent with certain disclosed embodiments. As shown in FIG. 2, computing device 110 may include one or more of the following components: a central processing unit (CPU) 211 configured to execute computer program instructions to perform various processes and methods; random access memory (RAM) 212 and read only memory (ROM) 213 configured to access and store information and computer program instructions; memory 214 to store data and information; database 215 to store tables, lists, or other data structures; I/O devices 216; interfaces 217; antennas 218; etc. Each of these components is well-known in the art and will not be discussed further.

Figure 3:
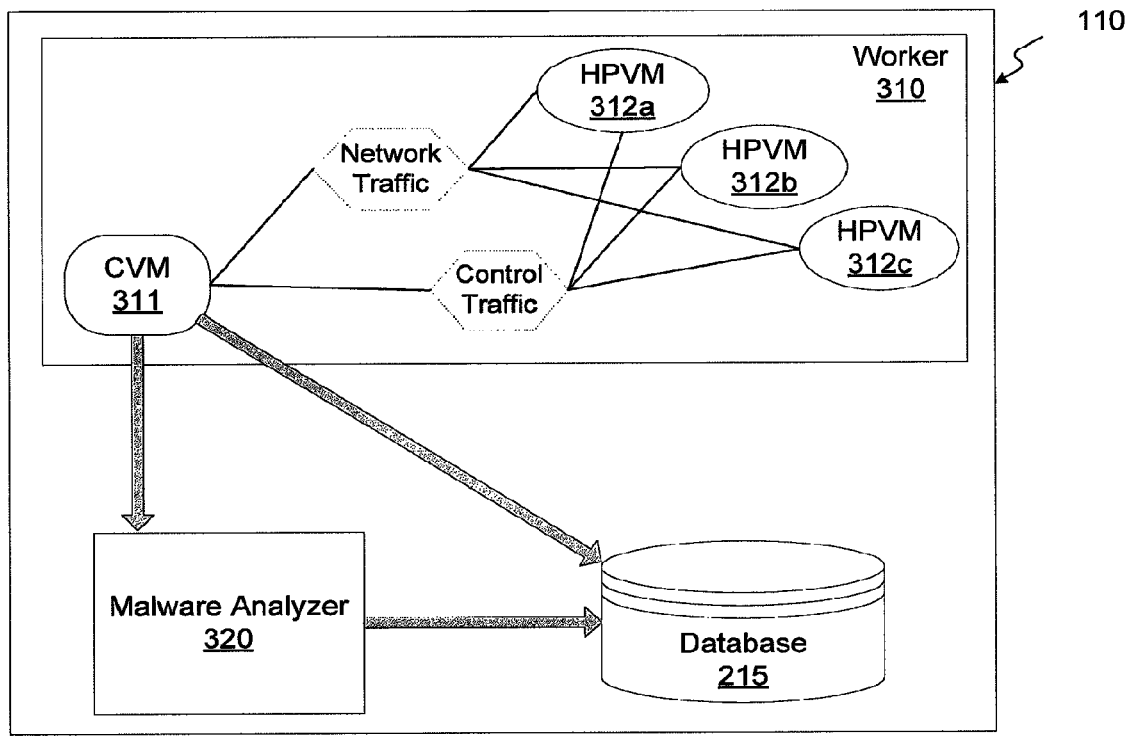
FIG. 3 illustrates an example of software components of the example computing device of FIG. 2, consistent with certain disclosed embodiments.

FIG. 3 is a block diagram illustrating exemplary software components of computing device 110, consistent with certain disclosed embodiments. As shown in FIG. 3, computing device 110 may include two logical components, worker 310 and malware analyzer 320, as well as a database, such as database 215.

In one implementation, database 215 may be a software database program configured to store data associated with computing device 110, such as, for example, a MySQL database. MySQL is a relational database management system (RDBMS) that may be configured to run as a server on computing device 110, thereby providing multi-user access to a number of other databases. In one implementation, memories 212, 213, and/or 214 may store software components 310 and 320, and CPU 211 be used to execute these software components.

In certain embodiments, worker 310 may be configured to operate one or more virtual machines (VMs). A VM may be a software implementation of a computer such that the VM may be configured to execute programs. In some embodiments, the VM may be a system that provides a platform to support operation of a complete operating system (OS), and may be configured to support execution of a plurality of programs and processes, such as, for example, a browser, one or more analysis tools, etc. In one implementation, worker 310 may include a single "controller" VM (CVM) 311, which may include a Honeypot Manager (HP-Manager), and one or more "honeypot" VMs (HPVMs) 312, such as, for example, HPVM 312a, HPVM 312b, and HPVM 312c, each of which may include a Honeypot Agent (HP-Agent). The HP-Manager and HP-Agents may communicate with one another, with the HP-Manager sending instructions to the HP-Agents.

Referring to HPVMs 312a-c of FIG. 3, each HPVM may include one or more browsers and/or other applications that may be considered vulnerable to malware infection. The HP-Agent may interact with the HP-Manager, receiving commands from the HP-Manager. These commands may be used to initiate the one or more browsers, instructing the browsers to visit a web page 120. The one or more browsers may be software programs configured to retrieve, present, and traverse (e.g., "crawl") information resources available on the Internet. Typically, an information resource may be identified by a URI, a URL, and/or a URN, and may include a web page, an image, a video, or other types of content. In some embodiments, browsers may be used to access information provided by web servers in private networks and/or files in file systems. Browsers may include, for example, MICROSOFT INTERNET EXPLORER™, GOOGLE CHROME™, FIREFOX™, APPLE SAFARI™, etc. In embodiments disclosed herein, the browsers operating in HPVMs 312 may function as web crawlers, systematically browsing the Internet in a methodical, automated manner. Using the browsers, one or more HPVMs 312 may visit the same or different URIs, URLs, and/or URNs at once and in parallel inside a single worker 310.

In addition, each HPVM 312 may also contain custom software that performs behavioral logging. In some embodiments, the behavioral logging system may perform system monitoring, such that all system activity is recorded and analyzed, to determine if any abnormal application programming interface (API) calls are made. The behavioral logging system may also look for patterns of API calls known to be made by malicious content that may be rendered by the browser. For example, the behavioral logging system may monitor API calls on HPVMs 312, including the specific calls necessary to write files to disk and execute programs on HPVMs 312. In some embodiments, any API call on an HPVM 312 may be determined to have been made by malware or related malware delivery code embedded in web pages 120. The behavioral logging system may send the API calls log to CVM 311, which may, in turn, store the monitored system activity in database 215 of computing device 110.

HP-Manager of CVM 311 may be configured to communicate with the HP-Agent daemon running on each HPVM 312 to provide instructions to HPVMs 312, and communicate with virtualization software in each HPVM 312 to control the starting, stopping, and reverting of HPVMs 312. For example, CVM 311 may determine the number of HPVMs 312 that are operational in worker 310, and provide instructions to each of HPVMs 312. Through its role as a router, CVM 311 may also be configured to determine a remote proxy system, such as proxies 160a and 160b of FIG. 1b, through which traffic may be relayed for each HPVM 312.

CVM 311 may also be configured to execute software that communicates with database 215 to determine the targeted URIs, URLs, and/or URNs to visit, as well as one or more parameters to be used when visiting the targeted URIs, URLs, and/or URNs. In one exemplary embodiment, the one or more parameters may be included in a malware scan request received by computing device 110 and stored in database 215. For example, the one or more parameters may include a type and version of browser, a type and version of operating system (OS), etc. In addition, the one or more parameters may be based on, for example, workload management and distribution criteria and/or rate-limiting criteria. Workload management and distribution criteria may include consideration of bandwidth utilization and costs, which may be affected by factors such as, for example, time of day, the number of IP addresses in a netblock, etc.

Rate-limiting may be understood as limiting the number of concurrent honeypots visiting web pages within a domain and/or a netblock. Rate-limiting may be performed based on one or more parameters, and these one or more parameters may be independently configurable for each domain and/or netblock. The one or more parameters may include, for example, a number of honeypots that are permitted to concurrently visit a given domain and/or netblock. The number of honeypots may be set arbitrarily by a system manager and/or at the request of the domain owner and/or netblock owner. In one exemplary implementation, the number of honeypots may be set to avoid overloading relatively smaller webserver hosts while being able to effectively hasten the scanning speed for relatively larger webserver hosts. The determination of webserver host size (e.g., smaller, larger, etc.) may be defined manually, through an automated process of netblock lookups that are correlated to a table of known large hosts (such as GODADDY™, BLUEHOST™, etc.), or any combination thereof.

In some embodiments, CVM 311 may also be configured to function as a router for all honeypot packets. That is, all data sent between HPVMs 312 and a remote webserver, such as, for example, hub 150a of FIG. 1b, may pass through CVM 311. In addition, CVM 311 may be configured to execute custom software that sorts and captures live network packets to and from the HPVMs 312, saves them into packet capture (pcap) files, and stores the packet capture file location in database 215 of computing device 110. That is, network traffic and control traffic may be sorted from one another as they are transmitted from HPVMs 312 to CVM 311 such that there is a clear record of all data transmitted between HPVMs 312 and one or more remote servers. This sorted data may then be analyzed by malware analyzer 320.

Further, CVM 311 may fetch the log of clickable links associated with the URI, URL, and/or URN visited by a browser operating in HPVMs 312, as well as the log of system API calls made by the browser using the HP-Agent, and may perform analysis on the system API call log using lists, such as, for example, white-lists and/or black-lists, of known system API calls made by the browser. Additionally, the CVM 311 may be configured to record the location of the pcap file and the clickable links log in a database, such as database 215, and indicate that the corresponding malware scan request is ready for analysis by malware analyzer 320.

Malware analyzer 320 may be a single self-contained computing device. In some embodiments, malware analyzer 320 may be a standalone computing device, such as computing device 110. In other embodiments, malware analyzer 320 may be a VM, and may be configured to operate on the same computing device 110 as CVM 311 and HPVMs 312. Malware analyzer 320 may be configured to receive data and instructions from CVM 311, and may perform malware analysis on the received data in accordance with the instructions. Malware analyzer 320 may store the results of its analysis in database 215. In one implementation, the results may be stored in database 215 using a received malware scan request as a key or index to the data stored in database 215.

Figure 4:
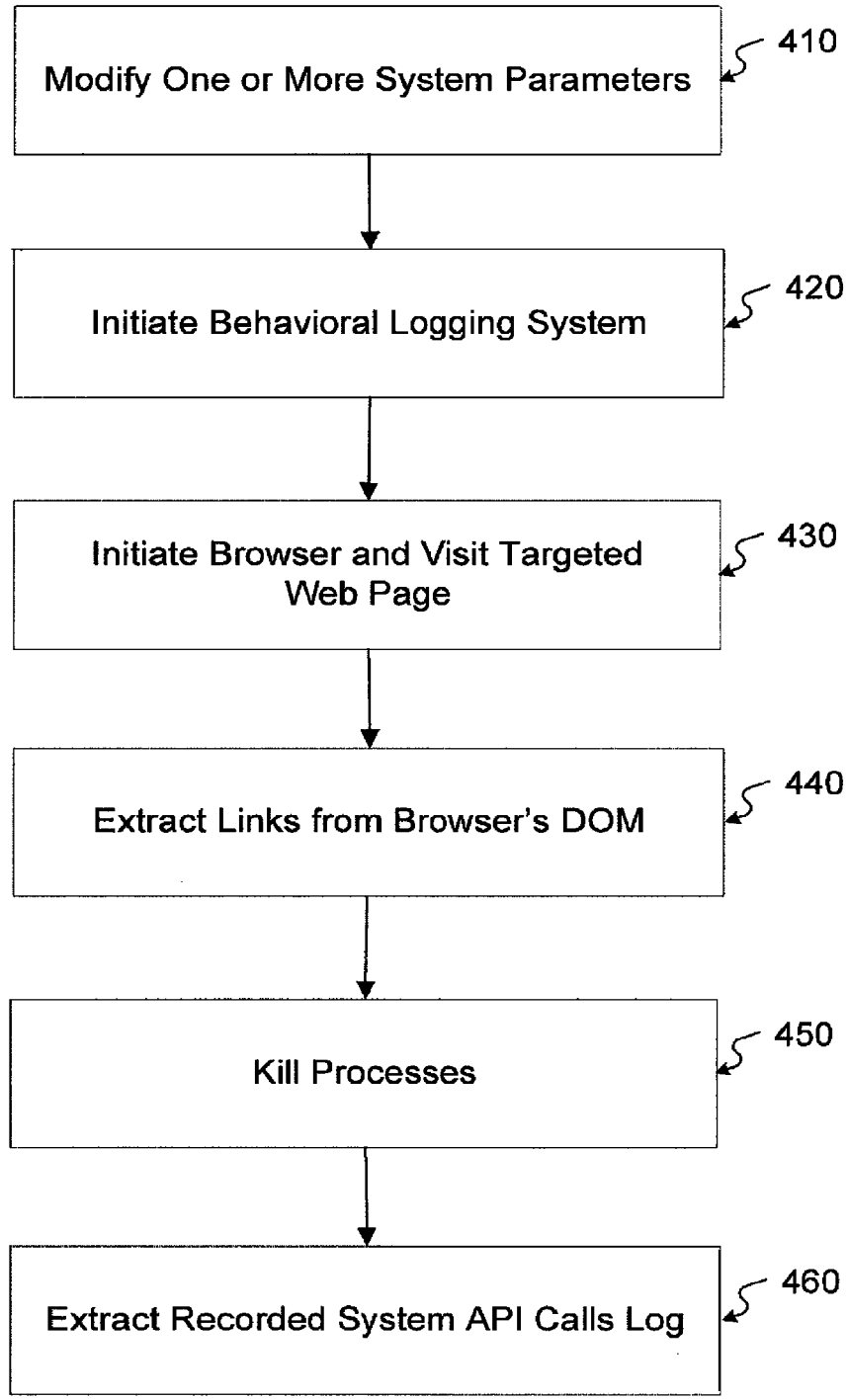
FIG. 4 is a flowchart illustrating a method for initiating a malware scan request in an example computing system, consistent with certain disclosed embodiments.

FIG. 4 is an exemplary flowchart 400 illustrating initiation of a malware scan request in an exemplary computing system, such as computing system 100, in accordance with certain implementations. Specifically, FIG. 4 illustrated a flowchart 400 consistent with example implementations of the present disclosure in which HPVM 312 performs malware scanning and detection. In come embodiments, such as those disclosed in co-pending, related U.S. patent application Ser. No. 12/982,540, HPVM 312 may be configured to perform malware scanning and detection upon receipt of a malware scan request from hub 140 via CVM 311.

As shown in FIG. 4, upon receiving instructions from CVM 311, HPVM 312 may modify one or more system parameters (step 410). Modifying the one or more system parameters may include, for example, deleting the existing browser cache files stored by HPVM 312. In addition, modifying system parameters may include installing session cookies and modifying user-agent strings used by the browser of HPVM 312.

HPVM 312 may then initiate the behavioral logging system (step 420). As discussed above in connection with FIG. 3, the behavioral logging system may perform system monitoring, such that all system activity is recorded and analyzed, to determine if any abnormal API calls are made. In addition, the behavioral logging system may identify patterns of API calls known to be made by malicious content.

Next, HPVM 312 may initiate the browser and instruct the browser to visit the targeted web page 120 (step 430). The HP-Agent of HPVM 312 may start any browser installed on HPVM 312. In some embodiments, the browser type and version may be included in the malware scan request, and may be sent from CVM 311 to HPVM 312. The type and version of browser operating in HPVM 311 may be determined based on any number of factors, including commercial popularity and use, known vulnerabilities, etc. HPVM 312 may use a browser with or without software patching. That is, in some embodiments, HPVM 312 may use a browser that has not been updated with software designed to fix known security vulnerabilities or other flaws, whereas in other embodiments, HPVM 312 may use a browser that has been updated with one or more software components. Visiting a targeted web page 120 may include retrieving data from the identified URI, URL, or URN associated with web page 120.

HPVM 312 may then extract links from the browser's DOM (step 440). In some embodiments, HPVM 312 may extract links associated with scripts and the like using the browser's exposed API. The extracted links may be compiled to create a set of clickable links.

After HPVM 312 has completed its visit to the targeted web page 120, HPVM 312 may kill the processes operating in HPVM 312 (step 450). That is, HPVM 312 may cause the browser and all so-called "helper" programs operating in HPVM 312 to be explicitly ended. At this time, the behavioral logging system may also be shut down.

HPVM 312 may extract the recorded system API calls log (step 460). HPVM 312 may transmit the extracted system API calls log to CVM 311, which may, in turn, transmit the system API calls log to malware analyzer 320. After the system API calls log is transmitted to CVM 311, the API calls log file may be deleted from HPVM 312, and the information and data collected from the visited web page 120 may be sent to malware analyzer 320, via CVM 311, for further analysis. In some embodiments, CVM 311 may store the data retrieved by HPVM 312, as well as the results of any analysis performed by CVM 311 or HPVM 312, on database 215 of computing device 110. In some embodiments, computing device 110 may transmit the stored data and/or results to hub 150, which may, in turn, transmit the data and/or results to malware controller 140.

Figure 5:
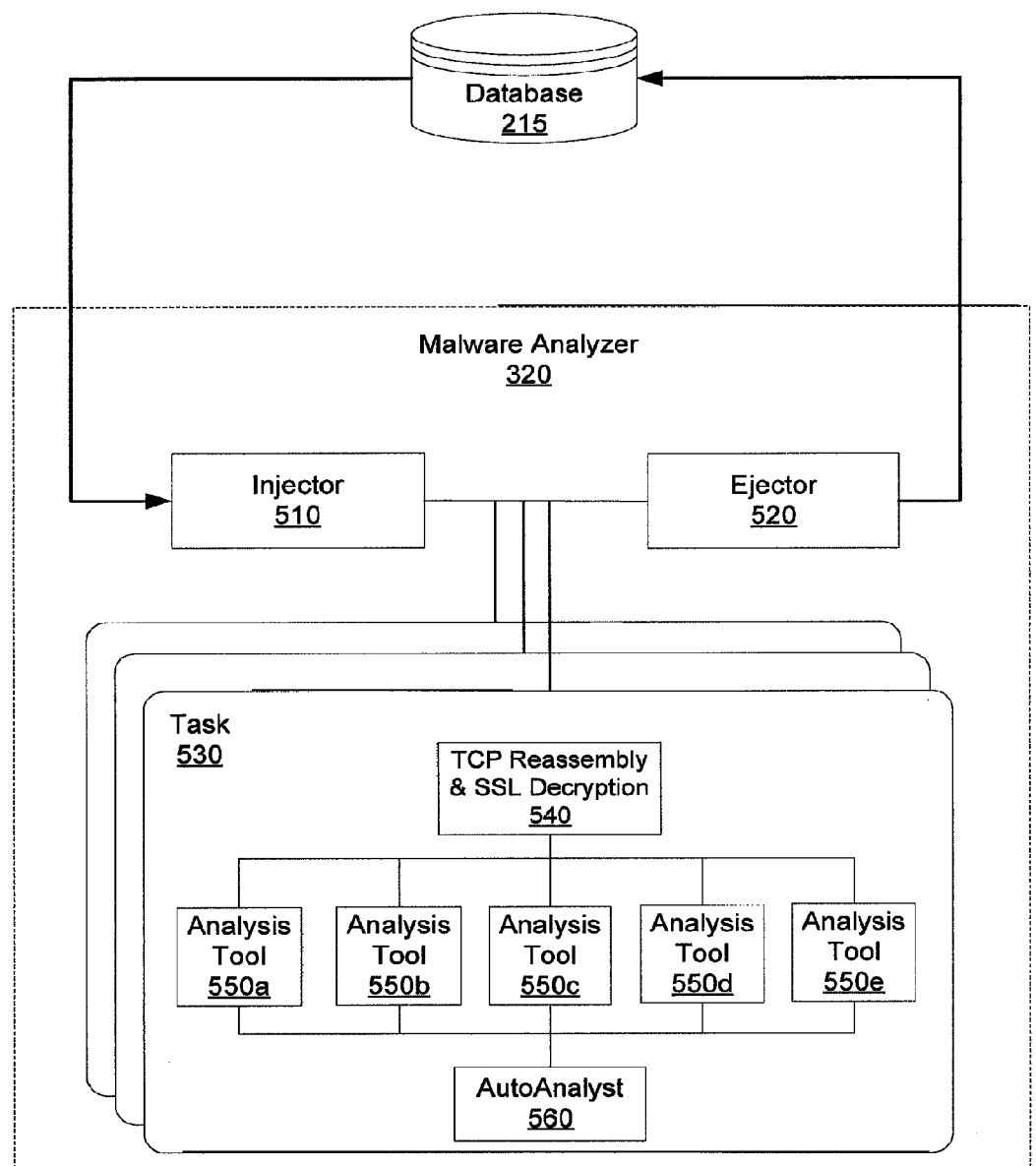
FIG. 5 illustrates an example of software components of the example malware analyzer of FIG. 3, consistent with certain disclosed embodiments.

FIG. 5 is an exemplary diagram 500 illustrating malware analyzer 320 and performance of a malware analysis, in accordance with certain implementations. Specifically, FIG. 5 is a diagram 500 consistent with example implementations of the present disclosure in which malware analyzer 320 performs malware analysis using database 215, as discussed above in connection with FIG. 2. In FIG. 5, malware analyzer 320 may include injector 510, ejector 520, and one or more tasks 530, in connection with which one or more analytical software processes may be performed, such as, for example, transmission control protocol (TCP) reassembly and secure sockets layer (SSL) decryption 540, analysis tools 550a, 550b, 550c, 550d, and 550e, and AutoAnalyst 560.

Injector 510 may be a software component configured to poll database 215 for malware scan requests, such as tasks 530, to analyze. In addition, injector 510 may be configured to transfer the mined-links log, which is created by the behavior logging system, and the pcap file to the correct positions on the disk.

Ejector 520 may be a software component configured to complete the analysis of malware scan requests, such as tasks 530. For example, ejector 520 may store the results of the any malware analysis performed by malware analyzer 320 in a database, such as database 215. In addition, ejector 520 may examine the mined-links log, and create one or more new tasks 530 based on one or more parameters defined in the task 530 being analyzed. That is, ejector 520 may initiate one or more new tasks 530 based on one or more URIs, URLs, and/or URNs identified in the task 530 being analyzed.

Ejector 520 may also compare mined-links (URIs, URLs, and/or URNs) against one or more lists. In some embodiments, ejector 520 may compare any, and even every, URI, URL, and/or URN found in web page 120 against one or more lists. The lists may include, for example, whitelists, AV blacklists, and/or malware blacklists. The AV and malware blacklists may be commercial blacklists, proprietary blacklists, or any combination thereof. The AV and malware blacklists may serve as access controls by identifying entities that are denied entry to a specific list (or a defined range) of users, programs, or network addresses.

In one example implementation, ejector 520 may compare the mined-links against blacklists to determine if any of the mined-links are links known to be malicious. Comparing the mined-links against blacklists may include, for example, looking for the existence of any URIs, URLs, and/or URNs in the blacklist that belongs to the domain of the current task. The outcome of this comparison may be, for example, a prioritized list of URIs, URLs, and/or URNs upon which malware analysis is to be performed, placing those URIs, URLs, and/or URNs that are determined to be malicious based on the comparison against the one or more lists at a higher priority on the prioritized list.

Tasks 530 may each be associated with a malware scan request, such as, for example, malware scan requests received from hub 150 of FIG. 1b. In some embodiments, the malware scan request may include the URI, URI, or URN of a web page that is to be analyzed. Tasks 530 may also be associated with tasks received from ejector 520, such as, for example, the URIs, URLs, and/or URNs in the prioritized list created by ejector 520.

Upon receiving a task 530, malware analyzer 320 may initiate malware analysis. For example, malware analyzer 320 may initiate TCP reassembly & SSL decryption 540. TCP reassembly & SSL decryption 540 may be used to capture pcap files, and perform TCP stream reassembly. In addition, TCP reassembly & SSL decryption 540 may create software objects upon which other analysis tools 550, such as, for example, JavaScript execution emulation, antivirus scanning, etc., can seamlessly operate. TCP reassembly & SSL decryption 540 may also allow for SSL-protected Hypertext Transfer Protocol (HTTP) traffic to be transparently reconstructed into software objects. Software objects may include, for example, images, javascripts, flash movies, cascading style sheets, AJAX messages, etc. TCP reassembly & SSL decryption 540 may store the software objects in database 215 of computing device 110.

Each of analysis tools 550 may be a software program and may be configured to perform malware scanning and analysis of web pages 120. Analysis tools 550 may include, for example, proprietary and/or commercial tools to dynamically and statically analyze Javascript (e.g., JsUnpack, etc.). In some embodiments, malware analyzer 320 may initiate JavaScript de-obfuscation. In one example implementation, de-obfuscation may be performed using a JavaScript execution emulation tool. The JavaScript execution emulation tool may be a software tool that processes pcap files, collecting the TCP streams and extracting the HTTP traffic. Malware analyzer 320 may store the results of the de-obfuscation analysis in database 215 of computing device 110. After de-obfuscation, objects may subsequently be subject to AV scanning, URL comparison, and IDS analysis.

In addition, analysis tools 550 may include proprietary and/or commercial antivirus (AV) scanning tools (e.g., AD-AWARE™, BITDEFENDER™, MCAFEE VIRUSSCAN™ NORTON ANTIVIRUS™, etc.) to perform AV scanning of one or more objects. In some embodiments, all software objects reconstructed from the network traffic are scanned with multiple AV software products. AV scanning may be used to detect computer viruses, worms, trojan horses, adware, spyware, etc. that may be embedded within the software objects associated with web page 120. Malware analyzer 320 may store the results of the AV scanning in database 215 of computing device 110.

Analysis tools 550 may also include proprietary and/or commercial tools to scan network traffic objects (e.g., "Matchbook," which is a proprietary tool, etc.) to identify matching patterns. Matchbook is an intra-object pattern matching system configured to identify malicious campaigns, specific "exploit kits," and other patterns. Typically, Matchbook is configured to operate on a collection of the individual objects requested by the browser when visiting a web page 120. In some embodiments, Matchbook may be configured to create a pattern associated with the visited web page 120, and compare the created pattern against other patterns associated with other web pages 120. When the created pattern matches the pattern of another web page 120 that has been previously determined to be malicious, Matchbook may identify the visited web page 120 as malicious as well. In other embodiments, Matchbook may be configured to compare characteristics of a visited web page 120 against a list of conditions or rules. When the characteristics match all of the conditions or rules on the list, Matchbook may identify the visited web page 120 as malicious. In other implementations, when the characteristics of a visited web page 120 match a predetermined number of the conditions or rules on the list, or the characteristics are within a predetermined threshold or range, Matchbook may identify the visited web page 120 as malicious. Malware analyzer 320 may store the results of the Matchbook analysis in database 215 of computing device 110.

In addition, analysis tools 550 may include proprietary and/or commercial tools to perform intrusion detection system (IDS) analysis to scan raw network traffic (e.g., "Snort," which is a proprietary tool, etc.). In one exemplary embodiment, IDS analysis may include review of raw network traffic between two systems to identify potential malware, such as, for example, obfuscated executable code in the traffic and potential cross-site scripting attacks. IDS analysis may also include performing network protocol analysis for anomaly detection. Malware analyzer 320 may store the results of the IDS analysis in database 215 of computing device 110.

Further, analysis tools 550 may include an incident classification tool that is configured to search for and identify patterns in the results of all other analysis tools' results for the purpose of classifying a potential malware attack and/or adding false-positives to one or more whitelists. Analysis tools 550 may include an HTTP object relationship mapping module for mapping the hierarchical relationships between the objects the browser requested based on HTML tag type or redirect type (HTTP 30× redirects).

Additionally, analysis tools 550 may include proprietary and/or commercial tools to perform document object model (DOM) tree emulation. DOM is a language-independent convention used to represent and interact with software objects in HTML, XHTML, and XML documents. In DOM, documents have a logical structure which can be referred to as a tree. DOM tree extraction may include, for example, parsing an HTML, XHTML, or XML document to obtain the logical structure of the objects within the document. The DOM tree emulator may be configured to parse and execute software objects requested by the browser of an HPVM 312, and build the DOM separate and apart from the requesting browser of the HPVM 312. The emulated DOM tree may be maintained while executing one or more JavaScripts, flash movies, java applets, etc. The output of the DOM tree emulator may serve as an input to one or more other analysis tools 550, such as, for example, a JavaScript execution emulation tool, etc. The DOM tree emulator may store the emulated DOM tree in database 215 of computing device 110.

Analysis tools 550 may also include proprietary and/or commercial tools to perform document object model (DOM) tree extraction. In some embodiments, the DOM tree extractor may be a plug-in configured to operate on top of, or in connection with, a browser operating in HPVM 312, such that DOM tree extraction may be performed by worker 310 of FIG. 3, and controlled via the HP-Manager and HP-Agent relationship in worker 310. The DOM tree extractor may be configured to provide a snapshot of the DOM tree at any given point in time. In one example implementation, after loading a URL in a browser operating in HPVM 312, malware analyzer 320 may wait for a given number of seconds for any javascripts to run, and then send a request for an updated DOM tree to worker 310. The DOM tree extractor may be configured to provide a snapshot of the DOM tree at any given point in time. The output of the DOM tree extractor may serve as an input to one or more other analysis tools 550, such as, for example, a JavaScript execution emulation tool, etc. The DOM tree extractor may store the extracted DOM tree in database 215 of computing device 110.

AutoAnalyst 560 may be a software tool configured to correlate the data obtained from one or more other analysis tools 550, and apply heuristic analysis to the correlated data. Using the results of AutoAnalyst 560, a web page 120 may be determined to be malicious or not. More specifically, one or more URIs, URLs, or URNs associated with web page 120 may be determined to be malicious. Malware analyzer 320 may store the results of the AutoAnalyst 560 analysis in database 215 of computing device 110. In some embodiments, computing device 110 may send the results of the AutoAnalyst 560 analysis to hub 150, which may, in turn, send the results of the AutoAnalyst 560 analysis to malware controller 140.

Although not illustrated, malware analyzer 320 may also include a software component that monitors "rule" or configuration files for changes. If any of these rule or configuration files is modified, this component may instruct malware analyzer 320 to reload the rules or configuration file of the indicated analysis tools 550. In some implementations, these files may be updated without needing to restart malware analyzer 320.

As discussed above, proxy 160 may be configured to operate as a proxy for one or more computing devices 110. Thus, the steps discussed above that are performed by computing device 110 may be routed through proxy 160, allowing proxy 160 to serve as an intermediary. In some embodiments, routing through proxy 160 by computing system 110 may be instructed by malware controller 140, hub 150, or any combination thereof.

In the disclosed embodiments, web servers attempting to infect computing devices with malware can be identified through IP diversification. This can be achieved by using VMs operating on computing devices physically located at an IP address, as well as through the use of proxies.

It is intended, therefore, that the specification and examples be considered as exemplary only, with a true scope and spirit of the disclosure being indicated by the following claims and their full scope of equivalents.

What is claimed is:

1. A computer-implemented method operating in a computing device, the method comprising:
    receiving, at a controller in the computing device, a malware scan request transmitted from a remote controller device via a network, the malware scan request comprising a type and version of an internet browser and one or more parameters, the one or more parameters comprising target uniform resource identifiers (URIs), uniform resource locators (URLs), and/or uniform resource names (URNs) used to identify web pages upon which malware scanning is to be performed, the computing device storing a plurality of virtual machines, wherein at least two of the plurality of virtual machines are within a same domain or a same netblock;
    launching, by the controller, the plurality of virtual machines in the computing device, in response to the received malware scan request;
    instructing, by the controller, each of the plurality of virtual machines of the computing device to:
        launch an internet browser of the type and version,
        request data from a web server hosting a web page over the network via the internet browser, wherein at least one of the plurality of virtual machines that are within the same domain or the same netblock is rate-limited; and
        perform, in the virtual machine of the computing device, analysis on the web page using one or more analysis tools; and
    receiving, from each of the plurality of virtual machines, results of the performed analysis; and
    storing, in a storage, the results of the performed analysis for malware analysis.

2. The computer-implemented method of claim 1, wherein performing the analysis includes:
    monitoring and recording of system application programming interface (API) calls,
    creating software objects associated with the web page,
    performing antivirus scanning of the software objects, and de-obfuscating code associated with the software objects; and
    correlating data associated with the analysis that is performed to determine if the web page is a malicious web page.

3. The computer-implemented method of claim 1, further comprising:
    routing, by the controller, traffic from each of the virtual machines through at least one proxy computing device in the network.

4. The computer-implemented method of claim 1, further including:
    creating, by the controller, packet capture (pcap) files; and
    storing the pcap files in a storage.

5. The computer-implemented method of claim 1, further including:
    comparing at least one of uniform resource identifier (URI), universal resource locator (URL) data, or uniform resource number (URN) data associated with the web page against one or more lists.

6. The computer-implemented method of claim 1, wherein potential malware includes one or more of obfuscated executable code and potential cross-site scripting attacks.

7. The computer-implemented method of claim 1, further including:
    matching a pattern of the web page with one or more other patterns known to be indicative of malware.

8. The computer-implemented method of claim 1, wherein the one or more parameters in the malware scan request includes a number of virtual machines to visit the web page, and wherein launching a plurality of virtual machines includes:
    launching the plurality of virtual machines based on the number of virtual machines included in the malware scan request.

9. A computing device for scanning and detection, the device comprising:
    at least one memory to store data and instructions; and
    at least one processor to access memory and to execute instructions to:
        receive, at a virtual machine controller in the computing device, a malware scan request transmitted from a remote controller device via a network, the malware scan request comprising a type and version of an internet browser and one or more parameters, the one or more parameters comprising target uniform resource identifiers (URIs), uniform resource locators (URLs), and/or uniform resource names (URNs) used to identify web pages upon which malware scanning is to be performed, wherein at least two of the plurality of virtual machines are within a same domain or a same netblock;
        launch, by the virtual machine controller, a plurality of virtual machines in the computing device, in response to the received malware scan request;
        instruct, by the virtual machine controller, each of the plurality of virtual machines of the computing device to:
            launch an internet browser of the type and version,
            request data from a web server hosting a web page over the network via the internet browser, wherein at least one of the plurality of virtual machines that are within the same domain or the same netblock is rate-limited; and
            perform, in the virtual machine of the computing device, analysis on the web page using one or more analysis tools;
        receive, from each of the plurality of virtual machines, results of the performed analysis; and
        store, in a storage, the results of the performed analysis for malware analysis.

10. The computing device of claim 9, wherein performing the analysis includes:
    monitoring and recording of system application programming interface (API) calls,
    creating software objects associated with the web page,
    performing antivirus scanning of the software objects, and de-obfuscating code associated with the software objects; and
    correlating data associated with the analysis that is performed to determine if the web page is a malicious web page.

11. The computing device of claim 9, wherein the processor is further to:
  route, by the virtual machine controller, traffic from each of the virtual machines through at least one proxy computing device in the network.

12. The computing device of claim 9, wherein the processor is further to:
  create, by the virtual machine controller, packet capture (pcap) files; and
  store the pcap files in a storage.

13. The computing device of claim 9, wherein the processor is further to:
  compare, by the virtual machine controller, at least one of uniform resource identifier (URI), universal resource locator (URL) data, or uniform resource number (URN) data associated with the web page against one or more lists.

14. The computing device of claim 9, wherein potential malware includes one or more of obfuscated executable code and potential cross-site scripting attacks.

15. The computing device of claim 9, wherein the processor is further to:
  match a pattern of the web page with one or more other patterns known to be indicative of malware.

16. The computing device of claim 9, wherein the one or more parameters in the malware scan request includes a number of virtual machines to visit the web page, and wherein launching a plurality of virtual machines includes:
  launching the plurality of virtual machines based on the number of virtual machines included in the malware scan request.

17. A non-transitory computer-readable medium containing instructions that, when executed by a computing device, cause the computing device to perform a method to:
  receive, at a virtual machine controller in the computing device, a malware scan request comprising a type and version of an internet browser and one or more parameters, the one or more parameters comprising target uniform resource identifiers (URIs), uniform resource locators (URLs), and/or uniform resource names (URNs) used to identify web pages upon which malware scanning is to be performed, wherein at least two of the plurality of virtual machines are within a same domain or a same netblock;
  launch, by the virtual machine controller, a plurality of virtual machines in the computing device, in response to the received malware scan request;
  instruct, by the virtual machine controller, each of the plurality of virtual machines of the computing device to:
    launch an internet browser of the type and version,
  request data from a webserver hosting a web page over a network via the internet browser, wherein at least one of the plurality of virtual machines that are within the same domain or the same netblock is rate-limited; and
    perform, in the virtual machine of the computing device, analysis on the web page using one or more analysis tools;
  receive, from each of the plurality of virtual machines, results of the performed analysis; and
  store, in a storage, the results of the performed analysis for malware analysis.

18. The non-transitory computer-readable medium of claim 17, wherein performing the analysis includes:
  monitoring and recording of system application programming interface (API) calls,
  creating software objects associated with the web page,
  performing antivirus scanning of the software objects, and
  de-obfuscating code associated with the software objects; and
  correlating data associated with the analysis that is performed to determine if the web page is a malicious web page.

19. The non-transitory computer-readable medium of claim 17, wherein the method is further to:
  route, by the virtual machine controller, traffic from each of the virtual machines through at least one proxy computing device in the network.

20. The non-transitory computer-readable medium of claim 17, wherein the method is further to:
  create, by the virtual machine controller, packet capture (pcap) files; and
  store the pcap files in a storage.

21. The non-transitory computer-readable medium of claim 17, wherein the method is further to:
  compare, by the virtual machine controller, at least one of uniform resource identifier (URI), universal resource locator (URL) data, or uniform resource number (URN) data associated with the web page against one or more lists.

22. The non-transitory computer-readable medium of claim 17, wherein potential malware includes one or more of obfuscated executable code and potential cross-site scripting attacks.

23. The non-transitory computer-readable medium of claim 17, wherein the method is further to:
  match a pattern of the web page with one or more other patterns known to be indicative of malware.

24. The non-transitory computer-readable medium of claim 17, wherein the one or more parameters in the malware scan request includes a number of virtual machines to visit the web page, and wherein launching a plurality of virtual machines includes:
  launching the plurality of virtual machines based on the number of virtual machines included in the malware scan request.

* * * * *